United States Patent
Ishmael, Jr. et al.

(10) Patent No.: US 6,636,202 B2
(45) Date of Patent: Oct. 21, 2003

(54) INTERACTIVE TACTILE DISPLAY FOR COMPUTER SCREEN

(75) Inventors: Nizamudeen Ishmael, Jr., Austin, TX (US); Kulvir Singh Bhogal, Fort Worth, TX (US); Javid Jameossanaie, Austin, TX (US); Mandeep Singh Sidu, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 09/844,397

(22) Filed: Apr. 27, 2001

(65) Prior Publication Data

US 2002/0158836 A1 Oct. 31, 2002

(51) Int. Cl.$^7$ ............................. G09G 5/00; H04B 3/36; H04Q 67/00; G09B 21/00
(52) U.S. Cl. ...................... 345/173; 345/31; 340/407.2; 340/825.19; 434/114
(58) Field of Search ................................ 345/108, 156, 345/157, 163, 173; 340/825.19, 407.1, 407.2; 434/112, 113, 114; 341/21, 22; 463/30; 382/114

(56) References Cited

U.S. PATENT DOCUMENTS

| | | | | |
|---|---|---|---|---|
| 5,065,434 A | * | 11/1991 | Matsuoka et al. | 382/114 |
| 5,186,629 A | * | 2/1993 | Rohen | 434/114 |
| 5,223,828 A | * | 6/1993 | McKiel, Jr. | 340/825.19 |
| 5,287,102 A | * | 2/1994 | McKiel, Jr. | 340/825.19 |
| 5,636,038 A | * | 6/1997 | Lynt et al. | 340/825.19 |
| 5,714,978 A | * | 2/1998 | Yamanaka et al. | 345/157 |
| 5,912,660 A | * | 6/1999 | Gouzman et al. | 345/163 |
| 5,942,970 A | * | 8/1999 | Norman | 340/407.1 |
| 6,046,722 A | * | 4/2000 | McKiel, Jr. | 345/157 |
| 6,278,441 B1 | * | 8/2001 | Gouzman et al. | 345/163 |
| 6,354,839 B1 | * | 3/2002 | Schmidt et al. | 434/113 |
| 6,417,821 B1 | * | 7/2002 | Becker et al. | 345/31 |
| 6,459,364 B2 | * | 10/2002 | Gupta | 340/407.1 |

FOREIGN PATENT DOCUMENTS

JP    08005357 A  *  1/1996  ........... G01B/21/20

* cited by examiner

Primary Examiner—Steven Saras
Assistant Examiner—Paul A. Bell
(74) Attorney, Agent, or Firm—Cynthia S. Byrd; Jeffrey L. Streets; Streets & Steele (57) ABSTRACT

Apparatus for converting a visual image into a tactile image. The apparatus comprises imaging means for converting incident light from the visual image into electrical signals that are proportional to the gray scale intensity of the incident light. The apparatus also comprises a tactile display device having a two-dimensional array of variable height pixels, wherein the height of each pixel in the tactile display is dynamically variable in proportion to the electrical signals from the imaging means. Preferably, the height of each pixel is inversely proportional to the gray scale intensity of the incident light so that the maximum height of a pixel occurs when a corresponding pixel in the visual image is black.

31 Claims, 8 Drawing Sheets

INTERACTIVE TACTILE DISPLAY FOR COMPUTER SCREEN

BACKGROUND OF THE INVENTION

1. Field of the Invention

The present invention relates to tactile displays.

2. Description of the Related Art

As the computer industry moves towards user interfaces that are more and more graphically oriented, most users are noticing an improved ease of use. But visually impaired people find graphically oriented computers, automatic teller machines, public information kiosks and the like extremely difficult for them to use, if not outright impossible. This schism between sighted and visually impaired users is even wider with the ever increasing use of touch screen technology, since keyboards or other input devices are no longer required, and the only feedback given to a user is often exclusively visual. A visually impaired user cannot use a conventional touch screen display, since he has no idea where to touch the display to instruct the computer to do what he wants it to do, and cannot receive any sufficient feedback indicating what is happening. The frustration of not being able to perform the routine daily functions of their sighted friends, such as withdrawing money from an automatic teller machine, makes their disability even more unfortunate, both to them personally and to society as a whole.

In addition, there is an increasing number of computer devices designed for an increasing variety of applications. These devices may vary in their operating system, hardware types, storage and processing capacities, input/output interface standards, physical dimensions, and the like. Accordingly, it is exceedingly expensive to design and build tactile interfaces for each of the vast array of equipment that is on the market. This expense is difficult for manufacturers to justify or recoup in light of the small market for such tactile display devices.

Furthermore, many of the "Braille" interpreting devices or software are limited to identifying and translating text to provide the equivalent Braille text. Pictures, charts, formatting and other graphical or image information does not survive the translation and is typically not provided to the user.

Therefore, there is a need for a tactile display device with a functioning touch screen that does not require the user to see an image on the display. It would be desirable if the tactile display device could be used universally with all makes, models, types and sizes of touch screens, without relying upon a particular system or requiring customization from one system to the next. It would be further desirable if the tactile display device could provide a tactile image in addition to text.

SUMMARY OF THE INVENTION

The present invention provides an apparatus for converting a visual image into a tactile image. The apparatus comprises imaging means for converting incident light from a visual image into electrical signals that are proportional to the gray scale intensity of the incident light. The apparatus also comprises a tactile display device having a two-dimensional array of variable height pixels, wherein the height of each pixel in the tactile display is dynamically variable in proportion to the electrical signals from the imaging means. Preferably, the height of each pixel is inversely proportional to the gray scale intensity of the incident light so that the maximum height of a pixel occurs when a corresponding pixel in the visual image is black. The density and resolution of the pixels in the tactile display device may vary, but the preferred ratio of tactile pixels to visual image pixels is one or less.

Preferably, the pixels of the tactile display device are pressure-sensitive for allowing touch-screen input. In one such embodiment, the tactile display means comprises: a plurality of individually controlled miniature motors oriented in a grid, wherein each motor is coupled to one of the electrical signals; a plurality of miniature rack and pinion gear assemblies, each of which is operatively connected to one of the miniature motors so that rotational motion of a pinion connected to a shaft of a miniature motor is converted into linear motion of a rack; and a plurality of rods, wherein each rod is connected to one of the racks so that the rods move linearly with the racks. Accordingly, the miniature motors move linearly in a Z dimension that is perpendicular to X and Y dimensions.

The apparatus of the invention are positioned or secured to a display screen or computer monitor using attachment means for attaching the imaging means in alignment with the display screen. Preferably, the imaging means is compatible with display screens of all many types, such as those displays selected from a cathode ray tube, liquid crystal display, array of light emitting diodes, laser images, projections, and combinations thereof. Most preferably, the display screen forms part of a portable or handheld computer, such as a personal digital assistant.

The foregoing and other objects, features and advantages of the invention will be apparent from the following more particular description of a preferred embodiment of the invention, as illustrated in the accompanying drawings wherein like reference numbers represent like parts of the invention.

The invention will now be described in more detail by example with reference to the embodiments shown in the Figures. It should be kept in mind that the following described embodiments is only presented by way of example and should not be construed as limiting the inventive concept to any particular physical configuration.

DETAILED DESCRIPTION

As used herein, "handheld computing device" or "handheld personal computer" (H/PC) means a small general computing device having a processing unit that is capable of running one or more application programs, a display, and an input mechanism that is typically something other than a full-size keyboard. The input mechanism might be a keypad, a touch-sensitive screen, a track ball, a touch-sensitive pad, a miniaturized QWERTY keyboard, or the like.

Figure 1:
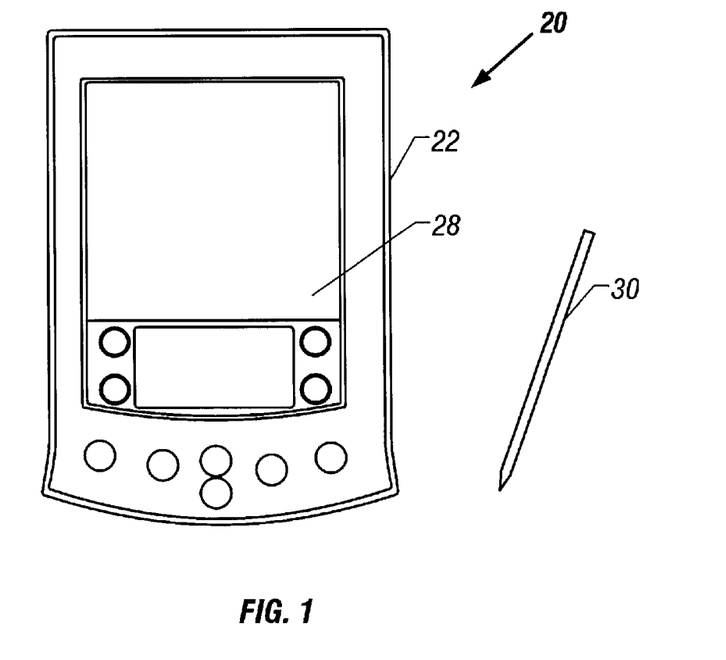
FIG. 1 illustrates preferred system architecture for a computer system suitable for carrying out the present invention.

FIG. 1 is an illustration of a handheld personal computer, specifically a personal digital assistant (PDA) 20, such as the IBM WorkPad® c3 from International Business Machines. However, the invention is compatible with other brands and types of handheld personal computers, such as a personal organizer, a palmtop computer, a computerized notepad, or the like.

Handheld computing device 20 has a casing 22 and an LCD (liquid crystal display) 28 with a touch-sensitive screen mounted in the casing 22. A stylus 30 may be used with the device to enter data through the touchscreen display 28. The handheld computing device 20 can also be implemented with a wireless transceiver (not shown) such as an IR (infrared) transceiver and/or an RF (radio frequency) transceiver.

Figure 2:
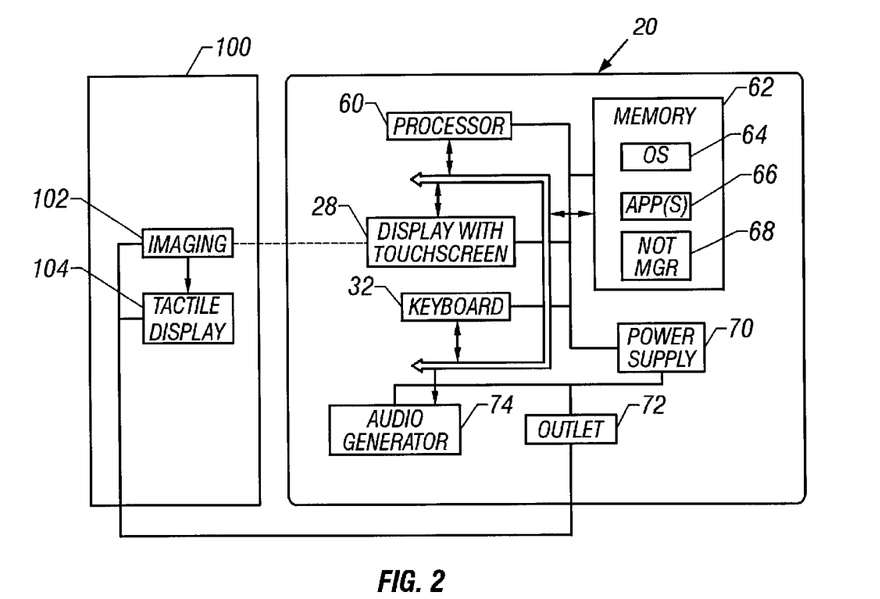
FIG. 2 is a block diagram of a portable handheld computing device.

FIG. 2 is a block diagram showing the functional components of the handheld computing device 20. It has a processor 60, a memory 62, a display 28, and an optional keyboard 32. The memory 62 generally includes both volatile memory (e.g., RAM) and non-volatile memory (e.g., ROM, PCMCIA cards, etc.). An operating system 64 is resident in the memory 62 and executes on the processor 60. The H/PC 20 preferably runs the Windows® CE operating system from Microsoft Corporation. This operating system is a derivative of Windows® brand operating systems, such as Windows® 95, that is specially designed for handheld computing devices. However, the handheld computing device may be implemented with other operating systems.

One or more application programs 66 are loaded into memory 62 and run on the operating system 64. Examples of applications include email programs, scheduling programs, PIM (personal information management) programs, word processing programs, spreadsheet programs, Internet browser programs, and so forth.

The H/PC 20 has a power supply 70, which is implemented as one or more batteries or fuel cells. The power supply 70 might further include an external power source that overrides or recharges the built-in batteries, such as an AC adapter or a powered docking cradle.

The H/PC 20 is also shown with an optional built in audio generator 74 and auxiliary electrical outlet 72 coupled to the power supply 70. Preferably, the auxiliary outlet 72 is directly coupled to the power supply 70 so that a peripheral device may remain on for a duration dictated by the peripheral device even though the H/PC processor and other components might shut down to conserve battery power.

FIG. 2 also shows the apparatus 100 of the present invention. The apparatus 100 includes an imaging device 102 and a tactile display 104. The imaging device 102 is shown in alignment with the display 28 of the H/PC 20 in order to receive light that is either emitted from the display (such as a CRT) or reflected off of the display (such as an LCD). It should be recognized that the alignment may be maintained in any fashion, such as attaching or fastening the apparatus 100 to the casing 22 of the H/PC 20, such as with straps, clips, or screws. While the apparatus 100 may have its own power supply or power cord for coupling to an electrical outlet, the apparatus 100 is shown coupled to the power supply 70 of the H/PC 20 through the auxiliary outlet 72.

Figure 3:
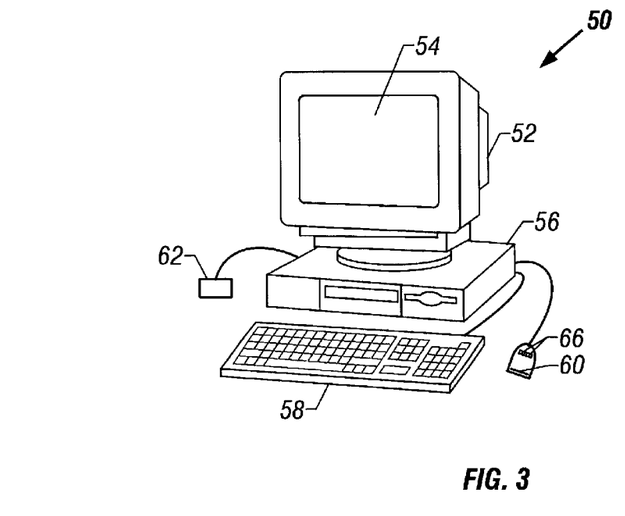
FIG. 3 illustrates an alternate computer system suitable for carrying out the present invention.

FIG. 3 shows a personal computer system 50, such as an IBM PS/2®, that includes a display device 52 (such as a monitor), a display screen 54, a cabinet 56 (which encloses components typically found in a computer, such as CPU, RAM, ROM, video card, hard drive, sound card, serial ports, etc.), a keyboard 58, a mouse 60 and a modem, router or network card 62. Mouse 60 may have one or more buttons or control devices, such as buttons 66. The computer preferably has a browser and some type of communication device such as modem 62 that allows computer system 50 to be connected to the Internet.

Figure 4:
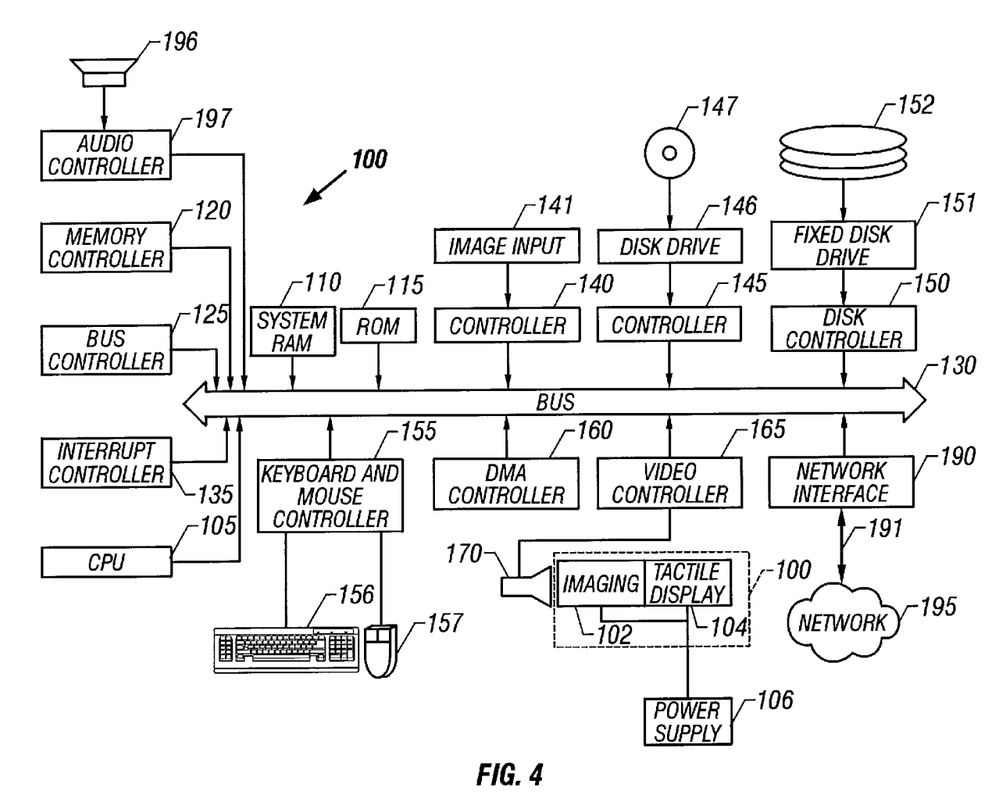
FIG. 4 is a block diagram of a desktop computing device.

FIG. 4 illustrates an exemplary system architecture for a computer system 100, such as the personal computer system 50 of FIG. 3, on which the invention may be implemented. The exemplary computer system of FIG. 4 is for descriptive purposes only. Although the description may refer to terms commonly used in describing particular computer systems, the description and concepts equally apply to other systems, including systems having dissimilar architectures.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Mass storage of data may be provided by a diskette, CD ROM 147, or hard drive 152. Data and software may be exchanged with computer system 100 via removable media 147 such as diskette of CD ROM. Removable media 147 is insertable into drive 146 that is, in turn, connected to bus 130 by a controller 145. Hard disk 152 is part of a fixed disk drive 151 that is connected to bus 130 by controller 150.

User input to computer system 100 may be provided by a number of devices. For example, a keyboard 156 and mouse 157 are connected to bus 130 by controller 155. Similarly, an image input device 141, such as a scanner, is connected to bus 130 by controller 140. An optional audio transducer 196, which may act as both a microphone and a speaker, is connected to bus 130 by audio controller 197, as illustrated. It will be obvious to those skilled in the art that other input devices, such as a pen and/or tabloid may be connected to bus 130 and an appropriate controller and software, as required. Direct memory access (DMA) controller 160 is provided for performing direct memory access to RAM 110. A visual display is generated by video controller 165 that controls video display 170. Computer system 100 also includes a communications adaptor 190 that allows the system to be interconnected to a local area network (LAN) or a wide area network (WAN), schematically illustrated by bus 191 and network 195.

Operation of computer system 100 is generally controlled and coordinated by operating system software, such as the OS/2® operating system, available from International Business Machines Corporation, Boca Raton, Fla. or Windows 95® from Microsoft Corp., Edmond, Wash. The operating system controls allocation of system resources and performs tasks such as processing scheduling, memory management, networking, and I/O services, among things. In particular, an operating system resident in system memory and running on CPU 105 coordinates the operation of the other elements of computer system 100. The present invention may be implemented with any number of commercially available operating systems including OS/2, UNIX Windows NT and DOS, etc. One or more applications, such as Lotus Notes, commercially available from Lotus Development Corp., Cambridge, Mass., may be executable under the direction of the operating system. If the operating system is a true multitasking operating system, such as OS/2, multiple applications may execute simultaneously.

In a similar manner to FIG. 2, FIG. 4 also shows the apparatus 100 of the present invention with its imaging device 102 aligned with the video display 170. The tactile display device 104 receives information in the form of light from the imaging device 102 and provides a tactile image in accordance with the information. In this embodiment, the apparatus 100 is shown coupled to an external power supply 106, such as an electrical outlet.

According to the invention, imaging means converts light received from the displayed visual image into electrical signals. An array of photometers of various types, such as photodiodes, may be used to form the imaging means. The tactile display means converts the electrical signals from the photometers into "tactile images" corresponding to the displayed visual image. Consequently, the tactile images can be perceived through the sense of touch by a person, such as a visually impaired person. Therefore, the tactile images are felt by the visually impaired person and enable them to interact with computers in a manner similar to how a sighted person would interact with graphical user interface. While the tactile display means is preferably of the same length and width dimensions as the image being processed, it is possible for the tactile display means to be scaled to a smaller or bigger size.

Figure 5A:
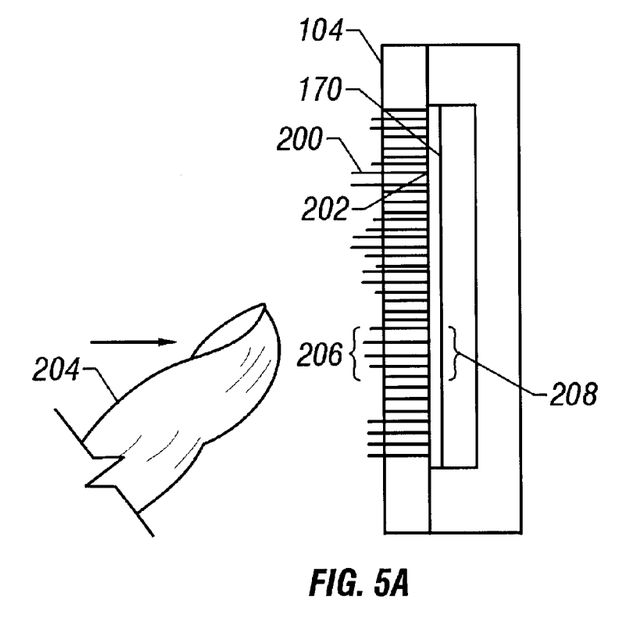
FIGS. 5A and 5B is a cross-sectional side view of a tactile display secured at a narrow gap from the surface of the touch screen.
Figure 5B:
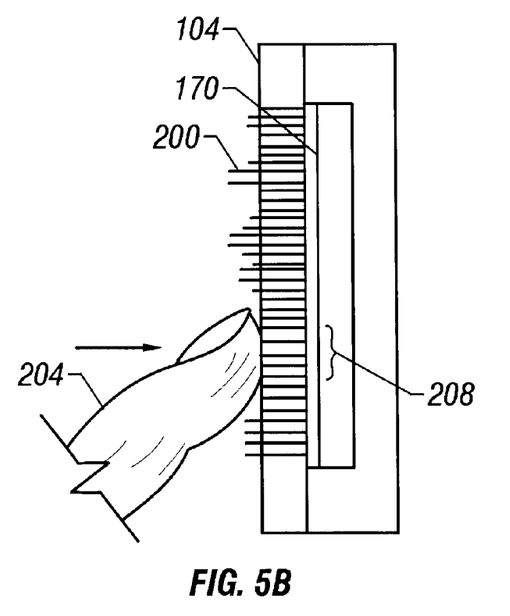

As shown in FIGS. 5A and 5B, the tactile display 104 may be secured at a narrow gap from the surface of the touch screen 170 so that touching or pressing the individual pins 200 in the tactile display conveys or transmits a similar touching or pressing upon the touch screen 170. By positioning the imaging means or photometer in or near the end 202 of the pins 200, the imaging/tactile device forms a true and complete interface, i.e., both input and output, between the touch screen 170 of the computing device and the operator's finger 204. The interaction between the tactile display and the touch screen display relies upon the user's touch input and does not require any direct electronic attachments or communications with the computing device. FIG. 5B illustrates that pressing the finger 204 against the pins 200 in a region 206 of the tactile display 104 will cause the pins to touch the touch screen 170 in a region 208 that is directly behind the region 206.

The tactile display means may comprise a plurality of individually controlled miniature actuators, a plurality of miniature gear assemblies, and a plurality of rods. The miniature actuators, e.g., motors, piezoelectric materials, shape memory elements or solenoids, are oriented in a grid, wherein each of the motors or solenoids responds to a portion of the processed electrical signals. Apparatus using shape memory elements to for a tactile display are described in U.S. Pat. No. 5,244,288, which patent is incorporated by reference herein.

Figure 6A:
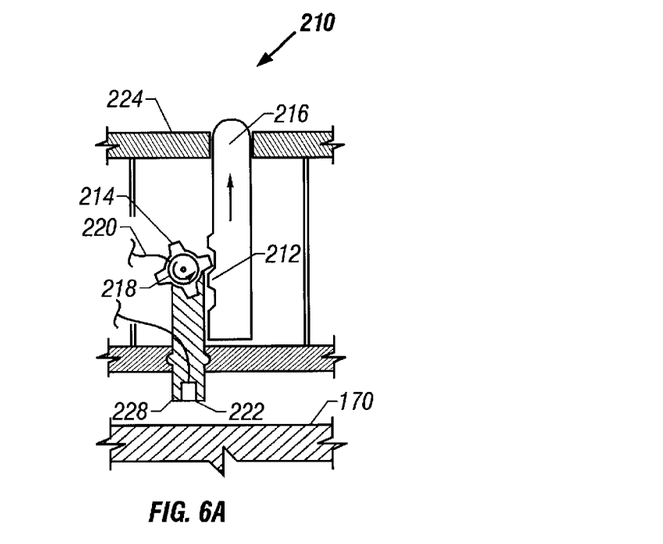
FIGS. 6A–C are side views of a miniature actuator assembly in accordance with one embodiment comprising a rack and pinion gear assembly.
Figure 6B:
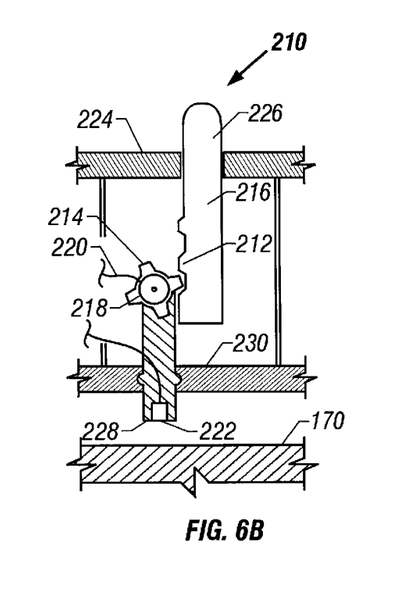
Figure 6C:
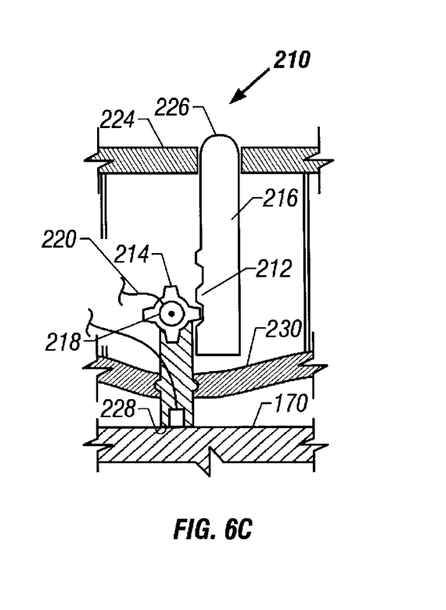

FIGS. 6A–C are side views of a miniature actuator assembly 210 in accordance with one embodiment comprising a rack 212 and pinion gear 214 assembly operatively connected to a rod 216 so that rotational motion of a pinion gear 214 connected to a shaft of a miniature actuator motor 218 is converted into linear motion of a rack. The rod 216 is connected to the rack 212 so that when the rack moves linearly, the rods move linearly as well. A tactile image is thus formed by incorporating an array of such miniature actuator assemblies 210. A similar rack and pinion actuator is described in U.S. Pat. No. 5,636,038, which patent is incorporated by reference herein.

In FIG. 6A, the rod or pin 216 is in the downward position as dictated by a control signal 220 that is directly or indirectly provided by the photometer 222 facing the touch screen 170. The photometer 222 is preferably formed in the end of the actuator assembly 210 and provides a signal representing the gray scale light intensity, or luminescence, to a controller that then forwards the control signal 220 to the motor 220. In FIG. 6B, the rod or pin 216 has been extended above the tactile display surface 224. In FIG. 6C, the rod or pin 216 is shown being depressed by a user in order to make a touch selection from the display. With the motor 218 held in position by the control signal 220 the actuator has a greater length than in FIG. 6A. Pressing upon the pin end 226 of the elongated actuator 210 causes the opposing end 228 having the photometer therein to flex against the touch screen 170. This flexing may be accommodated by using a flexible or rubber-like material 230 that will return the end 228 back to the position shown in FIG. 6A when the pin is no longer being depressed.

Figure 7:
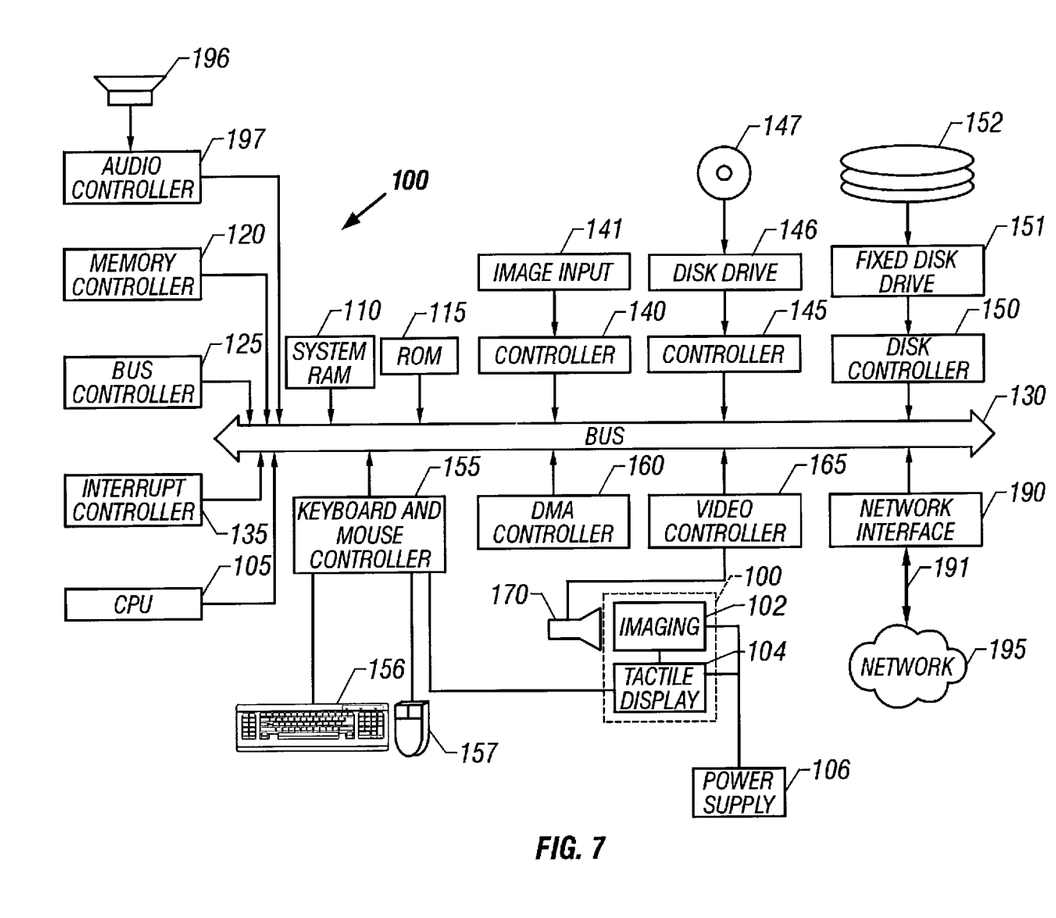
FIG. 7 illustrates a tactile display having built-in touch sensing means in some or all of the individual pixels of the tactile display and an electronic interface for communicating the touch sensing information to the computing device.
Figure 8:
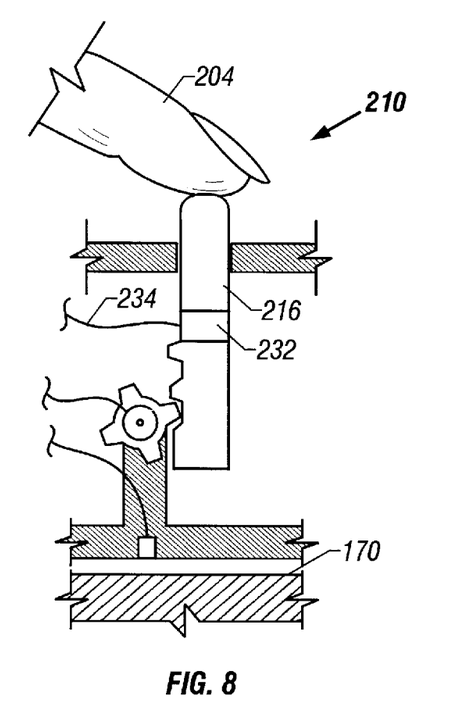
FIG. 8 illustrates an actuator assembly similar to FIGS. 6A–C, except that the individual rods may include strain gauges coupled through a wire to a separate input/output device of the computing device.

Alternatively, FIG. 7 illustrates the tactile display having built-in touch sensing means in some or all of the individual pixels of the tactile display 104 and an electronic interface for communicating the touch sensing information to the computing device 100. For example, FIG. 8 illustrates an actuator assembly similar to FIGS. 6A–C, except that the individual rods 216 may include strain gauges 232 coupled through a wire 234 to a separate input/output device 155 (See FIG. 7) of the computing device 100. In this latter manner, the touch screen functionality of the touch screen display 170 is effectively bypassed, yet the user would experience a similar touch sensitive interaction with the computer.

Figure 9:
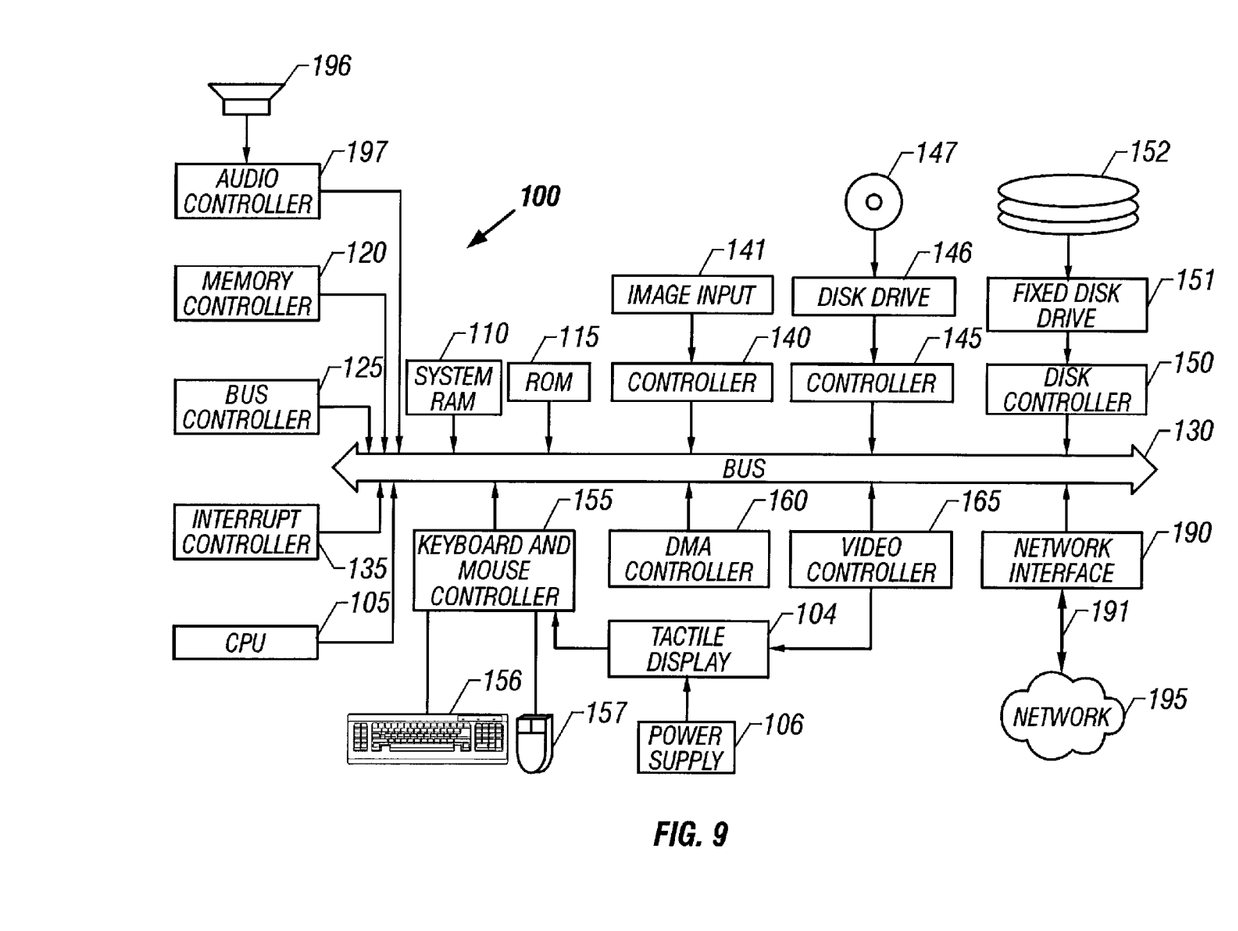
FIG. 9 is a block diagram of one embodiment of the invention allowing direct electronic communication between the tactile display and the computing device.

Similarly, as shown in FIG. 9, one embodiment of the invention would allow direct electronic communication between the tactile display 104 and the computing device 100. The output communication from the computing device 100 to the tactile display 104 may include attachment of the tactile display to the output of a video card 165. The video card would provide the dynamic grey scale information required by the tactile display. It should be recognized that in this embodiment, it is no longer necessary for the tactile display device 104 to include an imaging device 102, such as the photometers 222. Furthermore, the touch sensing functionality of the tactile display 104, such as that provided by strain gauges 232 in the individual actuators 210 that comprise the display 104, may be provided in direct electronic communication with the computing device 100 through an input/output card, such as a mouse port 155. It should be recognized that this direct electronic communication avoids the necessity of aligning the tactile display 104 with a touch screen display 170, if any, since no physical interaction such as touching is required. If both the input and output of the tactile display are provided in direct electronic communication with the computing device 100 as just described, then the tactile display 104 can be positioned without regard for the display screen.

Figure 10:
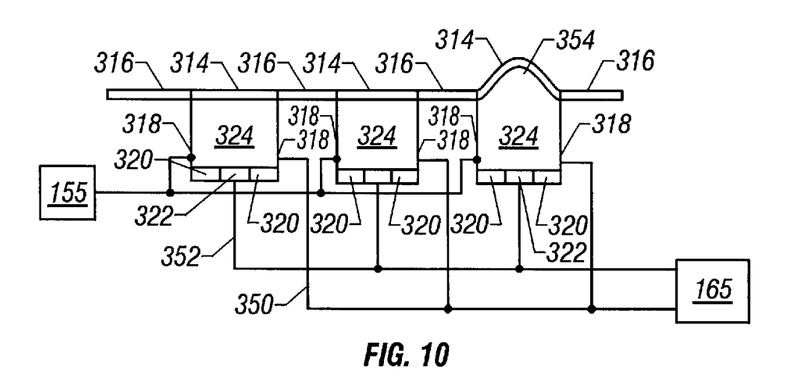
FIG. 10 is a cross-sectional side view of three gel cavities is accordance with a further embodiment of the invention attached to electronic means.

FIG. 10 is a cross-sectional side view of three gel cavities is accordance with a further embodiment of the invention attached to electronic means. Each cavity 324 is cylindrical, with a metallic side wall 318 serving as one electrode and another metal object 322 attached to the floor of the cavity as the other electrode. The gel cavity 324 is about 1.5 mm in diameter and about 1.0 mm in depth. An insulator 316 surrounds the cavity on the surface. The electrode attached to the floor of the cavity is a flat metal disc 322 surrounded by an insulator 320. A thin elastomeric film 314 tightly seals each cavity, so that the top of each cavity is held generally flat, by its own tension, in the absence of any voltage applied to the electrodes in the cavities. Each of the electrodes 322 attached to the floor of the cavities are attached to line 352 which connects to the video controller 165. Each of the metallic side wall electrodes 318 are attached to line 350 which connects to the video controller 165. When voltage is applied to the electrodes in a cavity, the gel in that cavity expands sufficiently to raise a dimple 354 in the elastomeric film. Several polar organic gels are feasible for implementation: poly(isopropylacrylamide), poly(acrylamide), poly (vinyl alcohol), and poly(N-propylacrylamide). These gels are not meant to limit the present invention, and are used only as an illustration to possible implementations.

The gel filling is a small quantity of polar organic gel sensitive to electric fields. Each cavity is individually addressable by electronic means. It is also as easily software-programmable as the bit-mapped video displays currently used by the sighted. This invention therefore can produce large and flexible tactile displays. The use of gel materials to form a tactile display is described in U.S. Pat. No. 5,580,251, which patent is incorporated by reference herein.

As can be seen, the invention may utilize several tactile display means, including mechanical means, electrochemical means, electromagnetic means, and fluid pressure means. For example, a suitable mechanical means includes rods, racks and gears. Suitable electrochemical means includes use of a polar organic gel in combination with electrodes. Exemplary electromagnetic means include an electromagnet causing a pin to move upwardly. Fluid pressure means may include either air or hydraulic fluid moving a pin upwardly. These examples are not meant to limit the present invention in any way. Any tactile display means would be acceptable.

The tactile display means converts the processed electrical signals from the processing means into so-called "tactile images." The tactile images may be felt by a visually impaired person enabling them to ascertain information by touch about the world around them that a sighted person would ascertain through vision. The tactile display means would be accessible for touching by a surface of the individual's body, typically fingertips, and would provide tactile stimulation to the surface of the individual's skin to form a representation of the visual image exposed to the imaging means. For example, if the imaging means were viewing a bar graph having different colors or shades, then the display means would provide a tactile image with each bar having a different height.

In accordance with the present invention, the height of the pixels in the tactile display is variable in proportion to the gray scale intensity of light incident on the imaging means from a visual display screen. The term "gray scale intensity" refers to the magnitude of light per unit area without regard to the actual color. However, as with the gray scale images on black and white televisions, colors are represented as various shades of gray along with white and black. While a gray scale display does not convey as much information as a color display, it is usually sufficient to gain an understanding of the image. This is particularly true in the computer environment where much of the content and information is textual. Even the HTML language uses text as the primary means of navigation through documents and the Internet.

Because the apparatus of the invention senses the gray scale intensity of images, the apparatus is compatible with a wide variety of displays, whether they emit light or merely reflect light. This ability allows the apparatus to work universally with color, monochrome, and LCD displays without customization of the apparatus.

Also, because the apparatus senses the light incident from a visual display, there is no need for the apparatus to be in electronic communication with the device generating the visual display. In particular, the apparatus is well suited to use as an add-on device, perhaps sold as an after-market product. It is a distinct advantage, both in terms of compatibility and manufacturing, that the apparatus can interface with all types of displays, regardless of the source of the displayed image, the type computer system, operating system, input/output protocol, and other system specific variables.

Perhaps the only customization that the apparatus will need is the length and width dimensions of the apparatus in conjunction with an attachment member for aligning and securing the imaging means to the visual display. For intermittent use, it may be perfectly acceptable to have an over-sized apparatus that can be laid over various sizes of visual displays. However, it is preferred that the apparatus be secured to the visual display in a manner that does not deter from the portability or utility of the visual display, such as a PDA. Such attachment members may include clips, straps, hook and loop fasteners, adhesives, friction fits, screws and other known devices that facilitate securing the tactile device onto the visual display.

In an exemplary embodiment, the display means could be formed as a two dimensional grid (X-Y dimensions) on which the individual would place their hand, for example. The surface of the grid would be formed by the ends of rods which would be moved up or down (Z dimension) under control of the processing means.

In more detail, in one embodiment, there is provided a plurality of individually controlled miniature motors oriented in a grid, each of which responds to a portion of the processed electrical signals. A plurality of miniature rack and pinion gear assemblies are also provided, each of which is operatively connected to one of the miniature motors so that rotational motion of a pinion connected to a shaft of a miniature motor is converted into linear motion of a rack. A plurality of rods form the surface of the tactile display, each of which is connected to one of the racks, so that when the racks move linearly, the rods move linearly as well. The relative linear motion of the individual rods forms a "tactile image." The motors could be formed by micro or nano-motors to produce very high resolution tactile images.

The device could also have applications for users who are not visually impaired but find themselves in conditions where visibility is limited. The invention thus covers a wide range of applications where transforming from the visual to the tactile has use.

In the preferred embodiment, the touch screen display is an IBM Model 8516 touch screen. While this touch screen display detects touch by using strain gauge technology, other touch screens, such as those employing optical or electrostatic technology, could also be used and still fall within the spirit and scope of the invention. Processor, memory, storage, and speaker preferably are standard components of a personal computer system, such as an IBM PS/2, although they could also be standalone components.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. An apparatus for converting a visual image into a tactile image, comprising:
   imaging means for converting incident light from a displayed visual image into electrical signals that are proportional to the gray scale intensity of the incident light, wherein the incident light is not focused through an optical system;
   a tactile display device having a two-dimensional array of variable height pixels, wherein the height of each pixel in the tactile display is dynamically variable in proportion to the electrical signals from the imaging means.

2. The apparatus of claim 1, further comprising means for recognizing words in the visual image and displaying the Braille translation of the words.

3. The apparatus of claim 1, wherein the height of each pixel is inversely proportional to the gray scale intensity.

4. The apparatus of claim 3, wherein maximum height of a pixel is occurs when a corresponding pixel in the visual image is black.

5. The apparatus of claim 1, wherein the ratio of pixels in the tactile display device to pixels in the visual image is one or less.

6. The apparatus of claim 1, wherein the pixels of the tactile display device are pressure-sensitive for allowing touch-screen input.

7. The apparatus of claim 1, wherein the pixels of the tactile display means comprises:
   a plurality of individually controlled miniature motors oriented in a grid, wherein each motor is coupled to one of the electrical signals;
   a plurality of miniature rack and pinion gear assemblies, each of which is operatively connected to one of the miniature motors so that rotational motion of a pinion connected to a shaft of a miniature motor is converted into linear motion of a rack; and
   a plurality of rods, wherein each rod is connected to one of the racks so that the rods move linearly with the racks.

8. The apparatus of claim 7, wherein the miniature motors move linearly in a Z dimension that is perpendicular to X and Y dimensions.

9. The apparatus of claim 1, further comprising:
   attachment means for attaching to imaging means in alignment with a display screen.

10. The apparatus of claim 9, wherein the display screen is selected from a cathode ray tube, liquid crystal display, array of light emitting diodes, laser images, projections, and combinations thereof.

11. The apparatus of claim 9, wherein the display screen is a computer monitor.

12. The apparatus of claim 11, wherein the computer monitor forms part of a portable computer.

13. The apparatus of claim 12, wherein the portable computer is a handheld computer.

14. The apparatus of claim 13, wherein the handheld computer is a personal digital assistant.

15. The apparatus of claim 7, the pixels further comprising a strain gauge for sensing applied pressure.

16. An apparatus for converting a visual image into a tactile image, comprising:
   a two-dimensional array of variable height actuator pins;
   a photometer formed in a first end of each of the actuator pins, wherein each photometer generates an electronic signal indicating the light intensity at the location of the photometer; and
   a computing device for receiving the electronic signal from the photometer and providing a control signal to each actuator pin in proportion to the electronic signal received from a photometer in the same location.

17. The apparatus of claim 16, wherein the photometer is a photodiode.

18. An apparatus for converting a visual image into a tactile image, comprising:
   imaging means for converting incident light from a visual image into electrical signals that are proportional to the gray scale intensity of the incident light;
   a tactile display device having a two-dimensional array of variable height pixels, wherein the height of each pixel in the tactile display is dynamically variable in proportion to the electrical signals from the imaging means, and wherein the pixels of the tactile display are pressure-sensitive for allowing touch-screen input.

19. The apparatus of claim 18, further comprising means for recognizing words in the visual image and displaying the Braille translation of the words.

20. The apparatus of claim 18, wherein the height of each pixel is inversely proportional to the gray scale intensity.

21. The apparatus of claim 20, wherein maximum height of a pixel is occurs when a corresponding pixel in the visual image is black.

22. The apparatus of claim 18, wherein the ratio of pixels in the tactile display device to pixels in the visual image is one or less.

23. The apparatus of claim 18, wherein the pixels of the tactile display means comprises:
   a plurality of individually controlled miniature motors oriented in a grid, wherein each motor is coupled to one of the electrical signals;
   a plurality of miniature rack and pinion gear assemblies, each of which is operatively connected to one of the miniature motors so that rotational motion of a pinion connected to a shaft of a miniature motor is converted into linear motion of a rack; and
   a plurality of rods, wherein each rod is connected to one of the racks so that the rods move linearly with the racks.

24. The apparatus of claim 23, wherein the miniature motors move linearly in a Z dimension that is perpendicular to X and Y dimensions.

25. The apparatus of claim 18, further comprising:
   attachment means for attaching the imaging means in alignment with a display screen.

26. The apparatus of claim 25, wherein the display screen is selected from a cathode ray tube, liquid crystal display, array of light emitting diodes, laser images, projections, and combinations thereof.

27. The apparatus of claim 26, wherein the display screen is a computer monitor.

28. The apparatus of claim 27, wherein the computer monitor forms part of a portable computer.

29. The apparatus of claim 28, wherein the portable computer is a handheld computer.

30. The apparatus of claim 29, wherein the handheld computer is a personal digital assistant.

31. The apparatus of claim 23, the pixels further comprising a strain gauge for sensing applied pressure.

* * * * *

UNITED STATES PATENT AND TRADEMARK OFFICE
CERTIFICATE OF CORRECTION

PATENT NO.    : 6,636,202 B2
DATED         : October 21, 2003
INVENTOR(S)   : Ishmael, Jr. et al.

It is certified that error appears in the above-identified patent and that said Letters Patent is hereby corrected as shown below:

<u>Column 9,</u>
Line 60, replace "attachment means for attaching to imaging means in" with
-- attachment means for attaching the imaging means in --.

Signed and Sealed this

Twenty-second Day of June, 2004

JON W. DUDAS
*Acting Director of the United States Patent and Trademark Office*